(12) United States Patent
Heitzmann et al.

(10) Patent No.: US 11,830,257 B2
(45) Date of Patent: Nov. 28, 2023

(54) METHOD, APPARATUS, AND NON-TRANSITORY COMPUTER READABLE STORAGE MEDIUM FOR CONFIRMING A PERCEIVED POSITION OF A TRAFFIC LIGHT

(71) Applicant: Valeo Schalter und Sensoren GmbH, Bietigheim-Bissingen (DE)

(72) Inventors: Thomas Heitzmann, San Francisco, CA (US); Romain Demarets, Maisons-Alfort (FR)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 245 days.

(21) Appl. No.: 17/501,662

(22) Filed: Oct. 14, 2021

(65) Prior Publication Data
US 2023/0117357 A1    Apr. 20, 2023

(51) Int. Cl.
*G06T 7/90*     (2017.01)
*G06V 20/58*    (2022.01)
(Continued)

(52) U.S. Cl.
CPC ............ *G06V 20/584* (2022.01); *G06N 7/01* (2023.01); *G06T 7/70* (2017.01); *G06T 7/90* (2017.01);
(Continued)

(58) Field of Classification Search
CPC ...... G06V 20/584; G06V 10/16; G06V 10/56; G06V 10/80; G06V 10/84; G06V 10/806;
(Continued)

(56) References Cited

U.S. PATENT DOCUMENTS 11,662,478 B2 *   5/2023   Reimer ................... G01S 19/53
                                                            342/352
2010/0209881 A1 *  8/2010   Lin ....................... G09B 19/167
                                                            434/66
(Continued)

FOREIGN PATENT DOCUMENTS

DE   10 2019 128 948 A1    4/2021
DE   10 2020 211 017 B3    9/2021
EP       3 770 879 A1      1/2021

OTHER PUBLICATIONS

International Search Report and Written Opinion dated Feb. 2, 2023 in PCT/US2022/046308 filed on Oct. 11, 2022, citing references 15-17 and 24-27 therein, 16 pages.
(Continued)

*Primary Examiner* — Ali Bayat
(74) *Attorney, Agent, or Firm* — Oblon, McClelland, Maier & Neustadt, L.L.P.

(57) ABSTRACT

A method, apparatus, and computer-readable medium for confirming a perceived position of a traffic light, by obtaining identifiers and results of a first perception of traffic lights associated with the identifiers, the results of the first perception including a first estimation of an ellipse encompassing each of the traffic lights, receiving results of a second perception of traffic lights associated with the identifiers, the results of the second perception including a second estimation of an ellipse encompassing each of the traffic lights, calculating, based on the first perception and the second perception, association parameters for each possible pair of estimated ellipses, selecting, based on the calculated association parameters for each possible pair of estimated ellipses, matching pairs of estimated ellipses, and fusing each matching pair of estimated ellipses.

20 Claims, 12 Drawing Sheets

(51) Int. Cl.
*G06T 7/70* (2017.01)
*G06V 10/56* (2022.01)
*G06V 10/84* (2022.01)
*G06V 10/10* (2022.01)
*G06V 10/80* (2022.01)
*G06N 7/01* (2023.01)

(52) U.S. Cl.
CPC .............. *G06V 10/16* (2022.01); *G06V 10/56* (2022.01); *G06V 10/80* (2022.01); *G06V 10/84* (2022.01); *G06T 2207/30252* (2013.01)

(58) Field of Classification Search
CPC .......... G06V 10/811; G06N 7/01; G06T 7/70; G06T 7/90; G06T 2207/30252; G01C 21/3811; G01C 21/3841; G08G 1/09623
USPC ........................................................ 382/103
See application file for complete search history.

(56) References Cited

U.S. PATENT DOCUMENTS

| | | | | |
|---|---|---|---|---|
| 2010/0209882 | A1* | 8/2010 | Lin | G09B 19/167 434/66 |
| 2013/0052614 | A1* | 2/2013 | Mollicone | G09B 19/167 434/65 |
| 2013/0179382 | A1* | 7/2013 | Fritsch | G08G 1/161 706/46 |
| 2019/0122073 | A1* | 4/2019 | Ozdemir | G06V 20/56 |
| 2020/0326667 | A1* | 10/2020 | Ahuja | G06N 3/08 |

OTHER PUBLICATIONS

Sequeira et al., "Robust Covariance Estimation for Data Fusion From Multiple Sensors", IEEE Transactions of Instrumentation and Measurement, Dec. 2011, vol. 60, No. 12, pp. 3833-3844, XP011361696.
Sequeira et al., "Robust covariance estimation in sensor data fusion", Safety, Security & Rescue Robotics (SSRR), 2009 IEEE International Workshop, Nov. 2009, 7 pages, XP031644382.
Costa et al., "Bearing-only Landmark Initialization with Unknown Data Association", Proceedings of the 2004 IEEE International Conference on Robotics & Automation, Apr. 2004, pp. 1764-1770, XP010768611.
Smith et al., "Approaches to Multisensor Data Fusion in Target Tracking: A Survey", IEEE Transactions on Knowledge and Data Engineering, Dec. 2006, vol. 18, No. 12, pp. 1696-1710, XP011149678.
Olivier Aycard, et al., "Intersection Safety using Lidar and Stereo Vision sensors", IEEE Intelligent Vehicles Symposium (IV), Jun. 5-9, 2011, pp. 863-869.
Pawel Kmiotek, "Multi-sensor data fusion for representing and tracking dynamic objects", Human-Computer Interaction [cs.Hc]. Universite Des Sciences Et Technologie De Cracovie, NNT : 2009BELF0121, 2009, 174 pages.

* cited by examiner

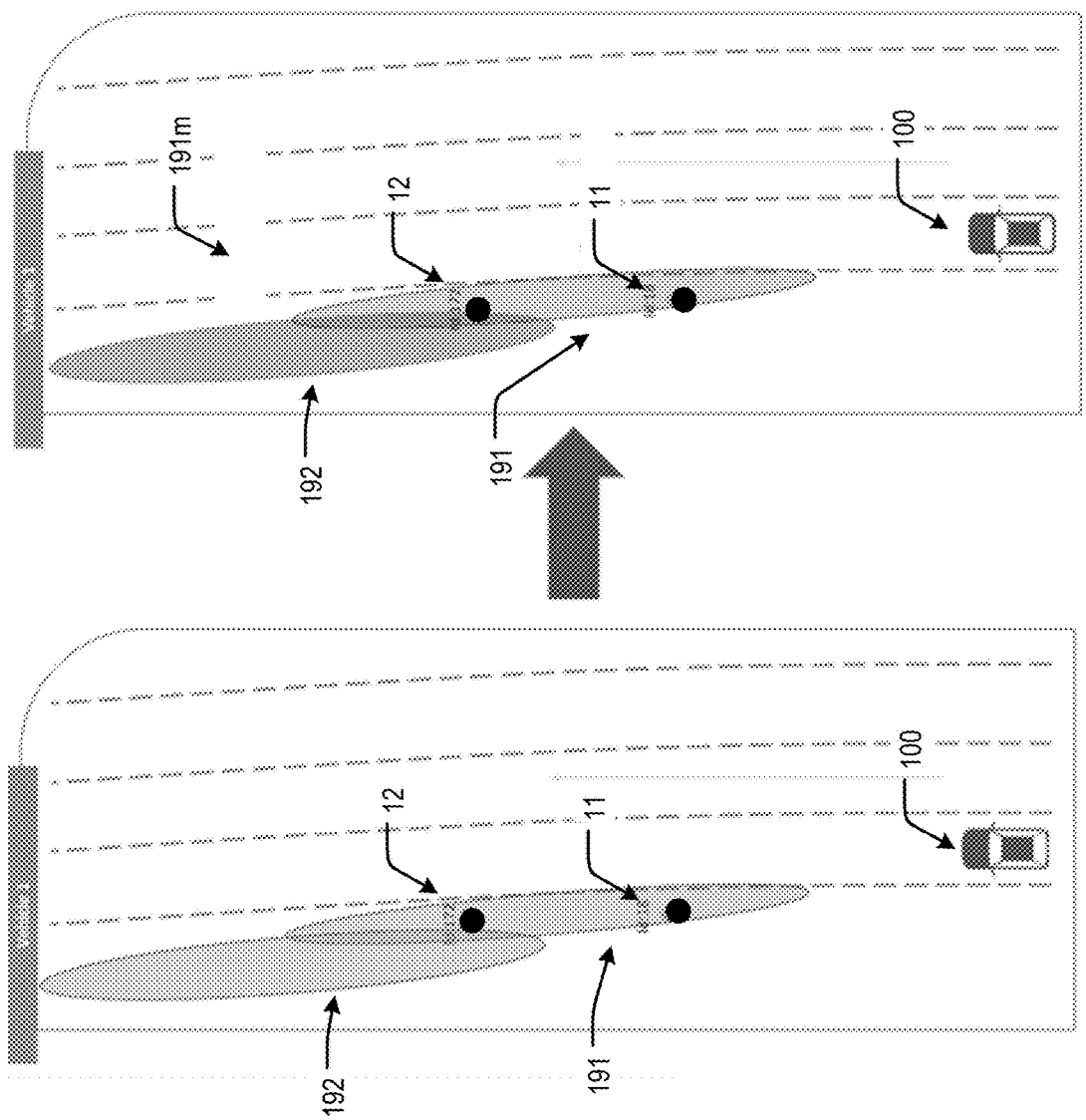

505 — Calculating association parameters for each possible pair of estimated ellipses encompassing each of the traffic lights perceived by the first vehicle and perceived by the second vehicle.

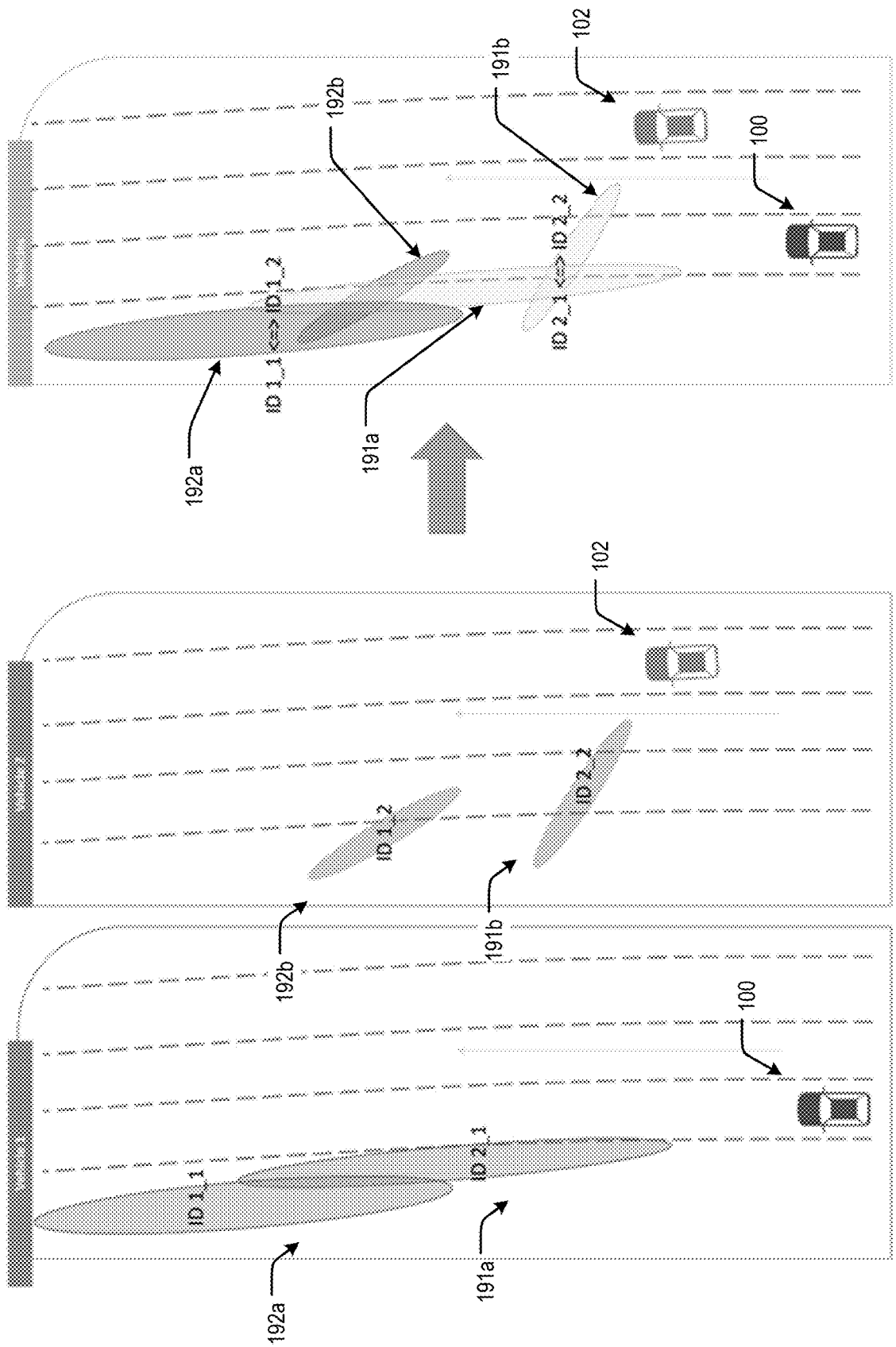

METHOD, APPARATUS, AND NON-TRANSITORY COMPUTER READABLE STORAGE MEDIUM FOR CONFIRMING A PERCEIVED POSITION OF A TRAFFIC LIGHT

BACKGROUND

Field of the Disclosure

The present disclosure relates to traffic light management and interactions thereof with autonomous vehicles.

Description of the Related Art

At modern-day intersections, traffic lights and stop signs assist human drivers in navigating their vehicles safely through cross traffic. However, as autonomous vehicles, wherein a computer is "behind the wheel", become increasingly common, interactions between traffic lights, stop signs, and autonomous vehicles will become increasingly critical for driver and passenger safety.

While popular approaches utilize smart infrastructure to allow communication between vehicles and traffic light conditions, road signage, and the like, implementation of such strategies relies on the widespread, and necessarily costly, deployment of smart devices. As such, a solution to providing awareness to autonomous vehicles, without the need for system changes to traffic infrastructure, is needed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

In an embodiment, the present disclosure further relates to a method for confirming a perceived position of a traffic light, comprising obtaining, by processing circuitry, traffic light identifiers and results of a first perception of traffic lights associated with the traffic light identifiers, the results of the first perception including a first estimation of an ellipse encompassing each of the traffic lights, the first perception being performed by a first vehicle, receiving, by the processing circuitry, results of a second perception of traffic lights associated with the traffic light identifiers, the results of the second perception including a second estimation of an ellipse encompassing each of the traffic lights, the second perception being performed by a second vehicle, calculating, by the processing circuitry and based on the obtained results of the first perception and the received results of the second perception, association parameters for each possible pair of estimated ellipses encompassing each of the traffic lights perceived by the first vehicle and perceived by the second vehicle, each possible pair of the estimated ellipses including one ellipse estimated by the first vehicle and one ellipse estimated by the second vehicle, selecting, by the processing circuitry and based on the calculated association parameters for each possible pair of estimated ellipses, matching pairs of estimated ellipses, and fusing, by the processing circuitry, each matching pair of estimated ellipses, each fused matching pair corresponding to one of the traffic light identifiers.

In an embodiment, the present disclosure further relates to an apparatus for confirming a perceived position of a traffic light, comprising processing circuitry configured to obtain traffic light identifiers and results of a first perception of traffic lights associated with the traffic light identifiers, the results of the first perception including a first estimation of an ellipse encompassing each of the traffic lights, the first perception being performed by a first vehicle, receive results of a second perception of traffic lights associated with the traffic light identifiers, the results of the second perception including a second estimation of an ellipse encompassing each of the traffic lights, the second perception being performed by a second vehicle, calculate, based on the obtained results of the first perception and the received results of the second perception, association parameters for each possible pair of estimated ellipses encompassing each of the traffic lights perceived by the first vehicle and perceived by the second vehicle, each possible pair of the estimated ellipses including one ellipse estimated by the first vehicle and one ellipse estimated by the second vehicle, select, based on the calculated association parameters for each possible pair of estimated ellipses, matching pairs of estimated ellipses, and fuse each matching pair of estimated ellipses, each fused matching pair corresponding to one of the traffic light identifiers.

In an embodiment, the present disclosure further relates to a non-transitory computer-readable storage medium storing computer-readable instructions that, when executed by a computer, cause the computer to perform a method for confirming a perceived position of a traffic light, comprising obtaining traffic light identifiers and results of a first perception of traffic lights associated with the traffic light identifiers, the results of the first perception including a first estimation of an ellipse encompassing each of the traffic lights, the first perception being performed by a first vehicle, receiving results of a second perception of traffic lights associated with the traffic light identifiers, the results of the second perception including a second estimation of an ellipse encompassing each of the traffic lights, the second perception being performed by a second vehicle, calculating, based on the obtained results of the first perception and the received results of the second perception, association parameters for each possible pair of estimated ellipses encompassing each of the traffic lights perceived by the first vehicle and perceived by the second vehicle, each possible pair of the estimated ellipses including one ellipse estimated by the first vehicle and one ellipse estimated by the second vehicle, selecting, based on the calculated association parameters for each possible pair of estimated ellipses, matching pairs of estimated ellipses, and fusing each matching pair of estimated ellipses, each fused matching pair corresponding to one of the traffic light identifiers.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4B is an illustration of covariance ellipses when there is overlap between perceived positions of traffic lights, according to an exemplary embodiment of the present disclosure;

FIG. 5A is a flow diagram of a sub process of a method for confirming a perceived position of a traffic light, according to an exemplary embodiment of the present disclosure;

FIG. 5B is an illustration of a sub process of resolving conflicts between perceived positions of traffic lights, according to an exemplary embodiment of the present disclosure;

DETAILED DESCRIPTION

Figure 1:
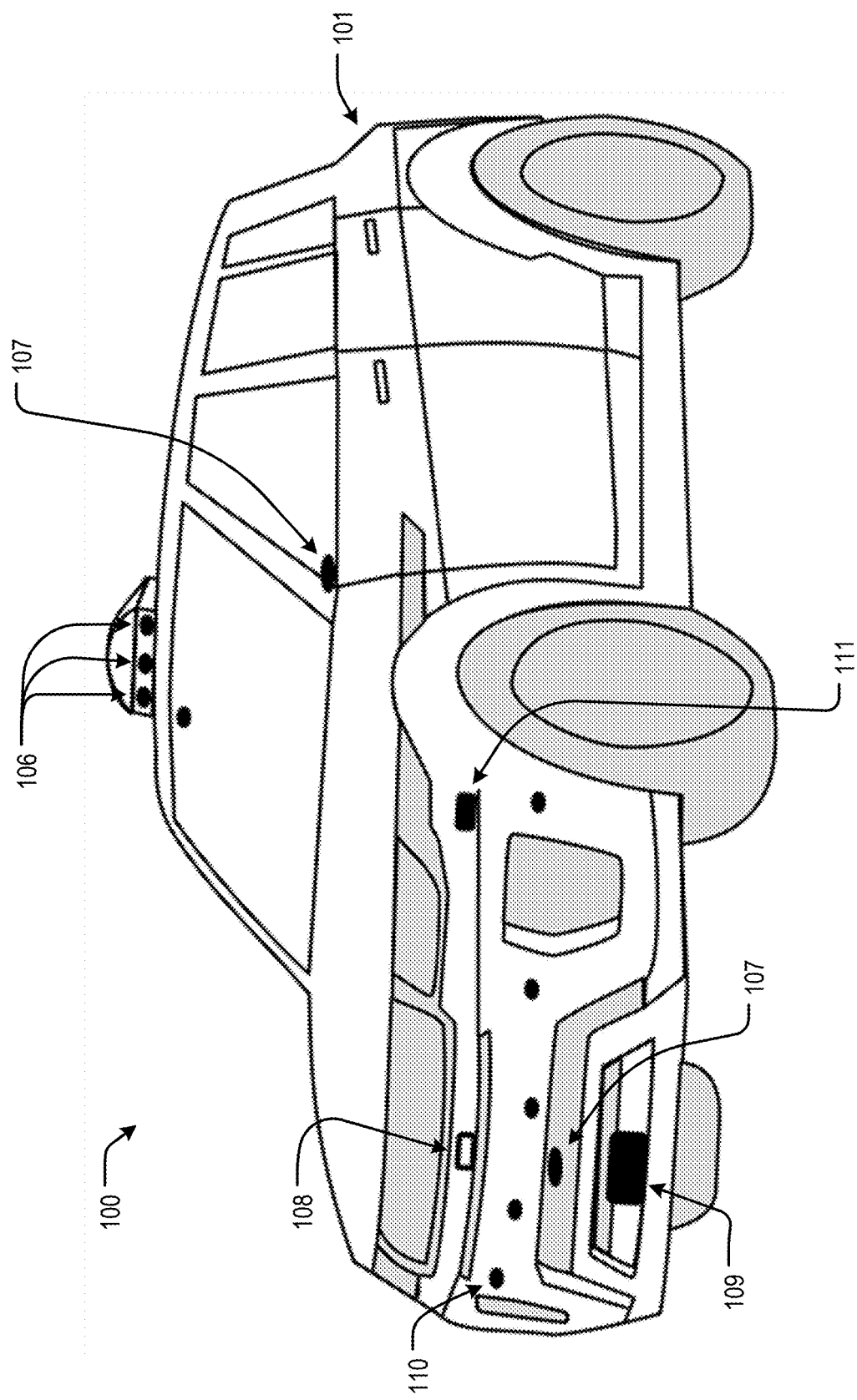
FIG. 1 is an illustration of an autonomous vehicle, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

In the not-so-distant future, city streets could be flooded with autonomous vehicles. Self-driving cars can move faster and travel closer together, allowing more of them to fit on the road—potentially leading to, as one example of many possible scenarios, congestion and gridlock on city streets.

Strategies for controlling traffic and enabling efficient travel of autonomous vehicles include the use of vehicle to infrastructure (V2I) communication. V2I communication is the two-way exchange of information between autonomous vehicles and traffic signals, lane markings, and other smart road infrastructure via a wireless connection. Generally, the goal of V2I communication is to improve road safety by reducing collisions and supporting work zone and traffic management.

The use of V2I communication strategies, however, relies on the deployment of a vast network of smart devices. For instance, V2I communication depends on smart traffic lights that are outfitted with cameras, communication units, and processing circuitry that enables conveyance of traffic light status to approaching vehicles. Widespread adoption of this approach can be impracticable when considered in view of the cost and hierarchical control of infrastructure construction.

Accordingly, the present disclosure eliminates the need for V2I communication by implementing vehicle-based determinations that exploit vehicle to vehicle (V2V) communication. V2V communication provides a mechanism for communication between vehicles that allows them to directly share information about their position, speed, status, and the like. For instance, in the context of the present disclosure, V2V communication provides a means by which data generated by sensors (e.g. ultrasonic sensor, radar and camera technologies) of each vehicle can be transmitted to other vehicles for on-board processing.

In particular, the methods of the present disclosure provide a means by which an autonomous vehicle can confirm a position of a traffic light, a status of the traffic light, and a relevance of the traffic light to the autonomous vehicle. This may be the case when several traffic lights are present at an intersection and an autonomous vehicle, in ordinarily determining a position of each traffic light, is unable to confidently associate an observed traffic light with a position thereof.

According to an embodiment, the present disclosure provides a method by which a first vehicle may confirm an estimated position of a traffic light. The confirmation may be performed by receiving related information from a second vehicle and, effectively, cross-referencing data in order to identify and locate particular traffic lights.

In an embodiment, the confirmation performed during the methods of the present disclosure can be informed by additional data such as high definition (HD) maps and the like.

To this end, and with reference now to the figures, FIG. 1 provides an illustration of an autonomous vehicle having vehicle sensors configured to perform sensing of the vehicle environment and, in particular, traffic guidance such as traffic lights.

Figure 9:
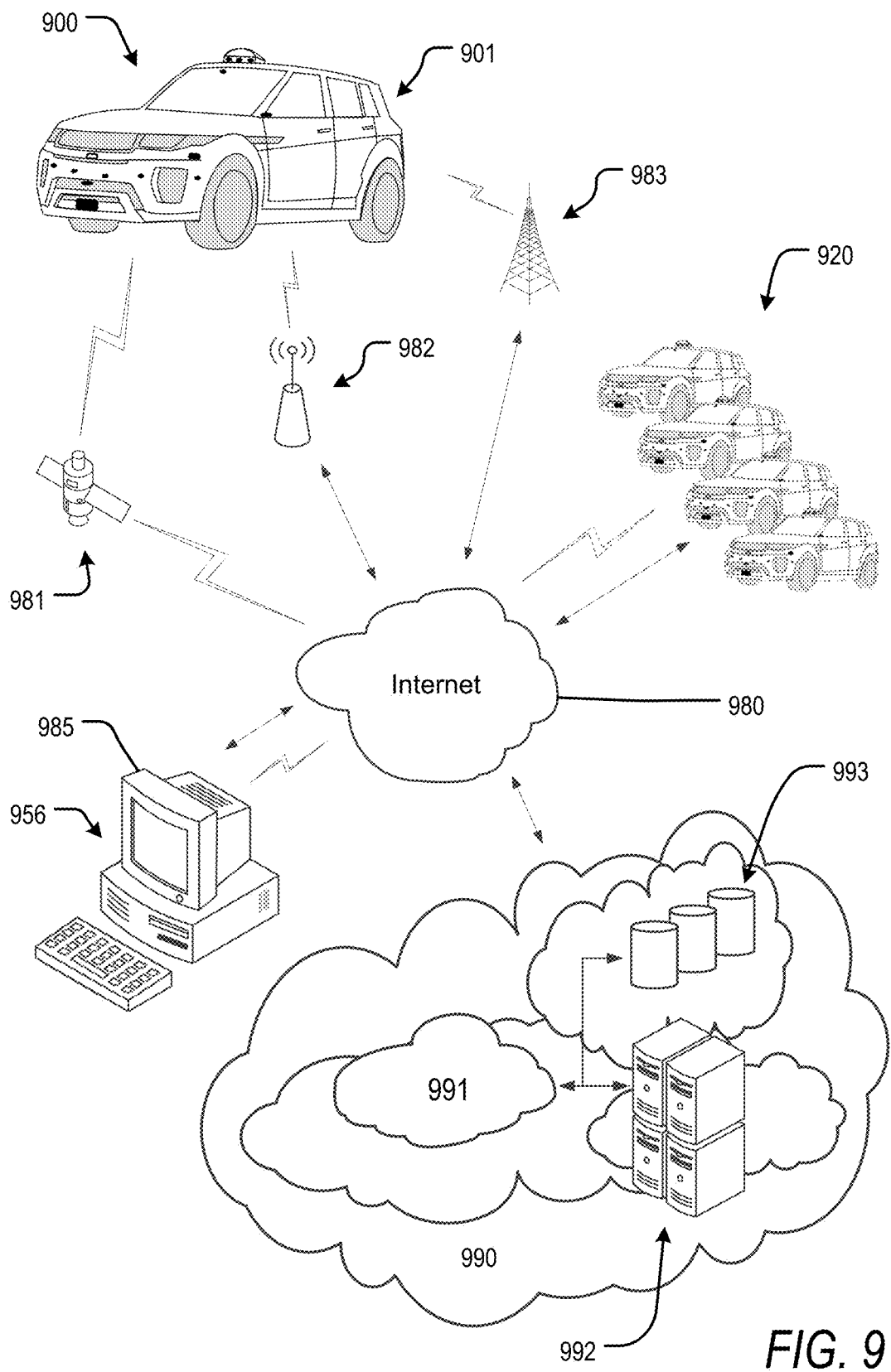
FIG. 9 is a schematic illustrating the communication architecture of a system for generation of and fleet distribution of local navigational map updates, according to an exemplary embodiment of the present disclosure.

FIG. 1 is an illustration of an autonomous vehicle (AV), according to an exemplary embodiment of the present disclosure. In order to operate accurately and with precision, the AV 100 can be outfitted with a plurality of vehicle sensors, including, among others, one or more cameras 106, one or more surround view cameras 107, at least one radar (radio detection and ranging; herein "radar") 108, at least one LiDAR (light detection and ranging; herein "lidar") 109, at least one ultrasonic sensor 110, and one or more corner radar 111. Data acquired from the plurality of vehicle sensors can be sent to a vehicle control system 101, comprising, among other components, processing circuitry, a storage medium, image processing circuitry, and communication circuitry, in order to be processed, both locally and globally, and utilized in navigation. In one embodiment, the vehicle control system can be an electronic control unit, "electronic control unit" being used therein to describe any embedded system in automotive electronics that controls one or more electrical systems or subsystems in a vehicle, including, among others, a telematics control unit and a powertrain control module. One implementation of the vehicle control system is illustrated in FIG. 9.

The above-described vehicle sensors of the AV 100 will be discussed in brief below.

Regarding the one or more cameras 106, the cameras may be positioned along a forward panel of the AV 100 and arranged such that, in the case of a plurality of cameras, a parallax is created between the viewpoints. The parallax can be subsequently exploited, based upon the fixed geometric relationship between the viewpoints along the panel of the AV 100, to determine a distance to an obstacle, or impediment. To this end, the one or more cameras 106 may provide mono- or stereoscopic perspective. The one or more cameras 106 can employ, among other sensors, complementary metal-oxide-semiconductor (CMOS) image sensors.

Regarding the one or more surround view cameras 107, the cameras may be positioned around the AV 100 in order to create a parallax and to obtain a 360° representation of the vehicle surroundings. As before, the parallax can be subsequently exploited, based upon the fixed geometric relationship between the viewpoints, in order to determine a distance to an obstacle, or impediment. The one or more surround view cameras 107 can employ, among other sensors, CMOS image sensors.

Regarding the above-described one or more cameras 106 and one or more surround view cameras 107, in addition to distancing, the output of the cameras can be further processed by the vehicle control system 101 to identify the vehicle surroundings. For instance, image processing circuitry of the vehicle control system 101 can perform an image classification operation on the output of the cameras.

Regarding the at least one radar 108, the radar 108 may be positioned along a forward panel of the AV 100. The at least one radar 108 can be one selected from a group of radars including, among others, short range radar, medium range radar, and long range radar. In an embodiment, and as employed commonly in Adaptive Cruise Control and Automatic Emergency Braking Systems, the at least one radar 108 is long range radar, with an operational range of, for example, a few hundred meters.

Regarding the at least one lidar 109, the lidar 109 may be positioned, for example, at a forward facing position and/or at a position with a 360° viewpoint. The at least one lidar 109 can be an infrared lidar system using a rotating laser via a micro-electro-mechanical system, a solid-state lidar, or any other type of lidar. In one embodiment, the at least one lidar 109 can provide a 905 nm wavelength with up to a 300 meter operational range.

In an embodiment radar and lidar may be interchangeable for certain distancing applications.

Regarding the at least one ultrasonic sensor 110, the ultrasonic sensor 110 may be disposed at corners of the AV 100 for, in particular, short-range distancing. The at least one ultrasonic sensor 110 can be an ultrasonic sensor having asymmetric directivity (110°×50°), short ringing time and high sound pressure, sensitivity and reliability, and be configured to produce, among others, a 40 kHz, 48 kHz, 58 kHz, or 68 kHz nominal frequency as required by the current situation.

Regarding the one or more corner radars 111, the corner radars 111 can be substantially similar to the above-described at least one radar 108. Deployed as the corner radars 111, the one or more corner radars 111 can be short range radar or medium range radar, as demanded, and can be broadband Frequency Modulated Continuous Wave radar.

A combination of longitudinally acquired (time-based) data from the above-described camera and distancing systems (radar and/or lidar) can be used to extract speed and outlines of obstacles and moving objects.

Figure 2:
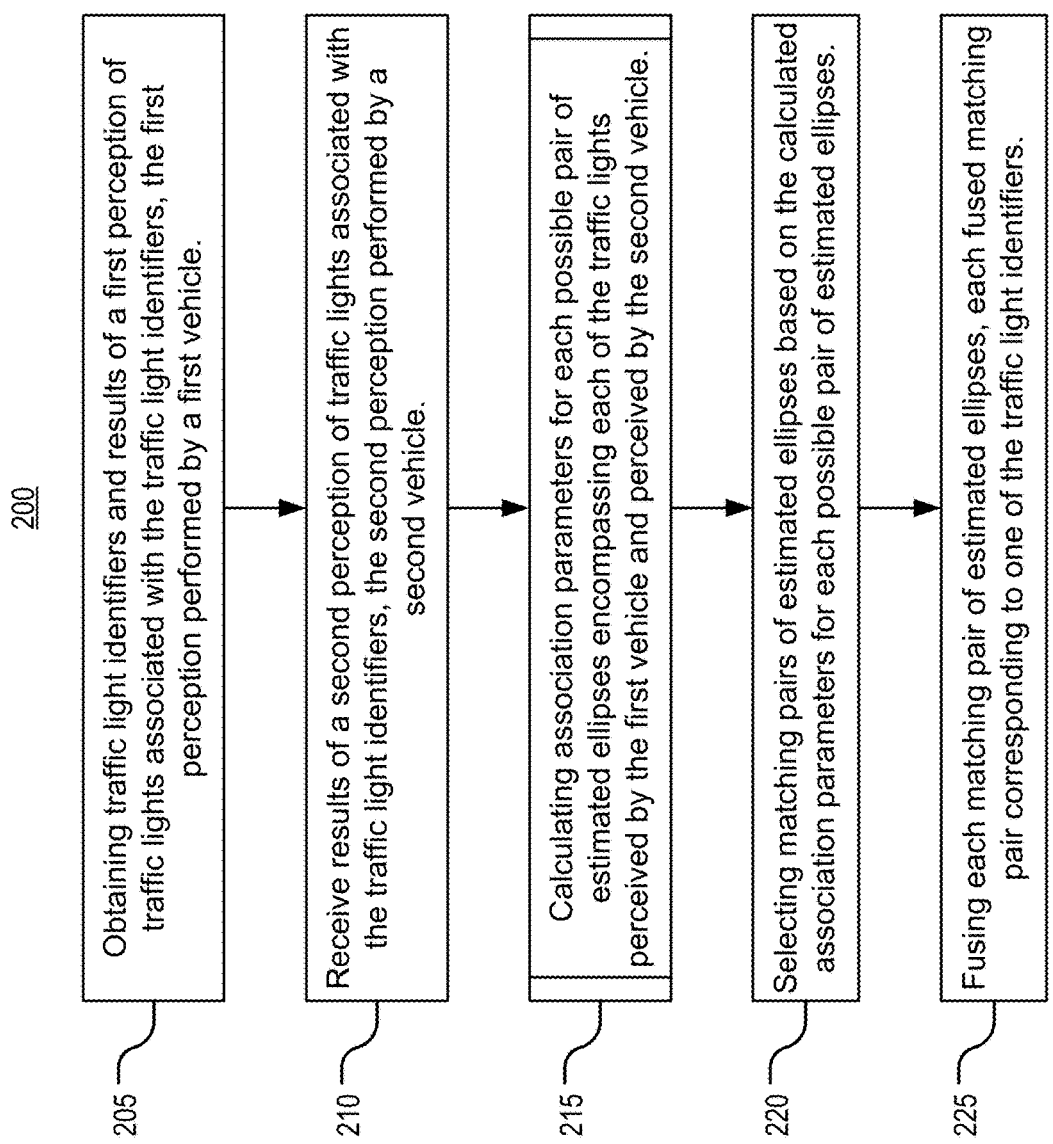
FIG. 2 is a flow diagram of a method of confirming a perceived position of a traffic light, according to an exemplary embodiment of the present disclosure.

According to an embodiment, and with reference to method 200 of FIG. 2, the above-described vehicle sensors, in communication with the vehicle control system 101, allow for remote control of a driving operation of the AV 100. For example, the one or more cameras 106 can be used to oversee the surrounding of the AV 100 when the remote operator is commanding the AV 100 to overtake an impediment. In instances where an object is proximal to the AV 100, and wherein the above-described cameras 106 are limited in their ability to accurately determine distances, a remote operator may use additional sensors, as described above, such as the one or more surround view cameras 107, the radar 108, the lidar 109, the at least one ultrasonic sensor 110, and the at least one corner radar 111, to remotely control the driving operation of the AV 100. It can be understood by one of ordinary skill in the art that the above-described vehicle sensors do not constitute an exhaustive list and are merely exemplary of vehicle sensors that may be found on an AV. In that context, any combination of vehicle sensors, described herein or not, can be integrated in order to achieve the function of operation of an AV, either autonomously or through remote operation.

Described herein, the AV 100 sensors detect traffic lights and perform an association of the traffic lights from a high definition (HD) map by using the distance uncertainty of the sensor (e.g., camera) detections. In an embodiment, the AV 100 can further include or be equipped with an internet connection and can communicate with a host server. At least one of the one or more cameras 106, the one or more surround view cameras 107, the radar 108, the lidar 109, the at least one ultrasonic sensor 110, and the at least one corner radar 111 can be configured to detect an attribute of a traffic light, such as a displayed color. The AV 100 can further import auxiliary data, such as an HD map that includes traffic light attributes. For example, a live-updated map of a city traffic light grid can be imported or evolved by the AV 100. Notably, the AV 100 can have a predetermined positional accuracy in the HD map, such as within 10 centimeters, or within 5 centimeters, or within 1 centimeter of accuracy. The AV 100 can be configured to, via the vehicle control system 101 (e.g., processing circuitry), perform an association between the traffic lights in the HD map and a local perception around the AV 100 detected by the many sensors.

To this end, FIG. 2 is a flow diagram of a method of confirming a perceived position of a traffic light, according to an exemplary embodiment of the present disclosure.

In step 205, traffic light identifiers and results of a first perception of traffic lights associated with the traffic light identifiers are obtained, the first perception being performed by a first vehicle.

In step 210, results of a second perception of traffic lights associated with the traffic light identifiers are received, the second perception being performed by a second vehicle.

In step 215, association parameters for each possible pair of estimated ellipses encompassing each of the traffic lights perceived by the first vehicle and perceived by the second vehicle are calculated.

In step 220, matching pairs of estimated ellipses based on the calculated association parameters for each possible pair of estimated ellipses are selected.

In step 225, each matching pair of estimated ellipses are fused together, each fused matching pair corresponding to one of the traffic light identifiers.

Figure 3:
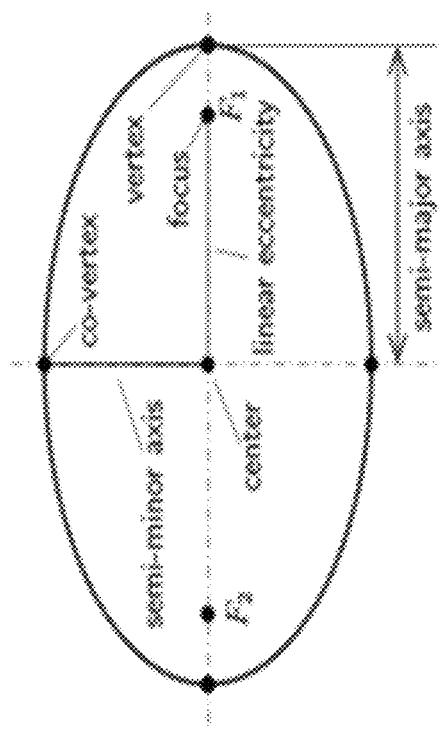
FIG. 3 is an illustration of a covariance ellipse, according to an exemplary embodiment of the present disclosure.

FIG. 3 is an illustration of a covariance ellipse, according to an exemplary embodiment of the present disclosure. In an embodiment, a mathematical representation is provided to model the traffic light error as an ellipse to describe the distance uncertainty. The error in distance can be represented with what is called a covariance ellipse error. In the special case of traffic light detection, this covariance ellipse can represent the error in range and bearing in polar coordinates (r, θ). The covariance ellipse can be generated and provided, and can be the result of a tracking process, such as a Kalman filter. The covariance ellipses can be represented by a semi-minor and major axis as the error in distance of a detected traffic light.

In an embodiment, the major axis is the range uncertainty, denoted as $\mu_r$, and bearing uncertainty, denoted as $\mu_\theta$. The corresponding covariance matrix is then defined as:

$$R = \begin{bmatrix} \mu_r & 0 \\ 0 & \mu_\theta \end{bmatrix}$$

Figure 4A:
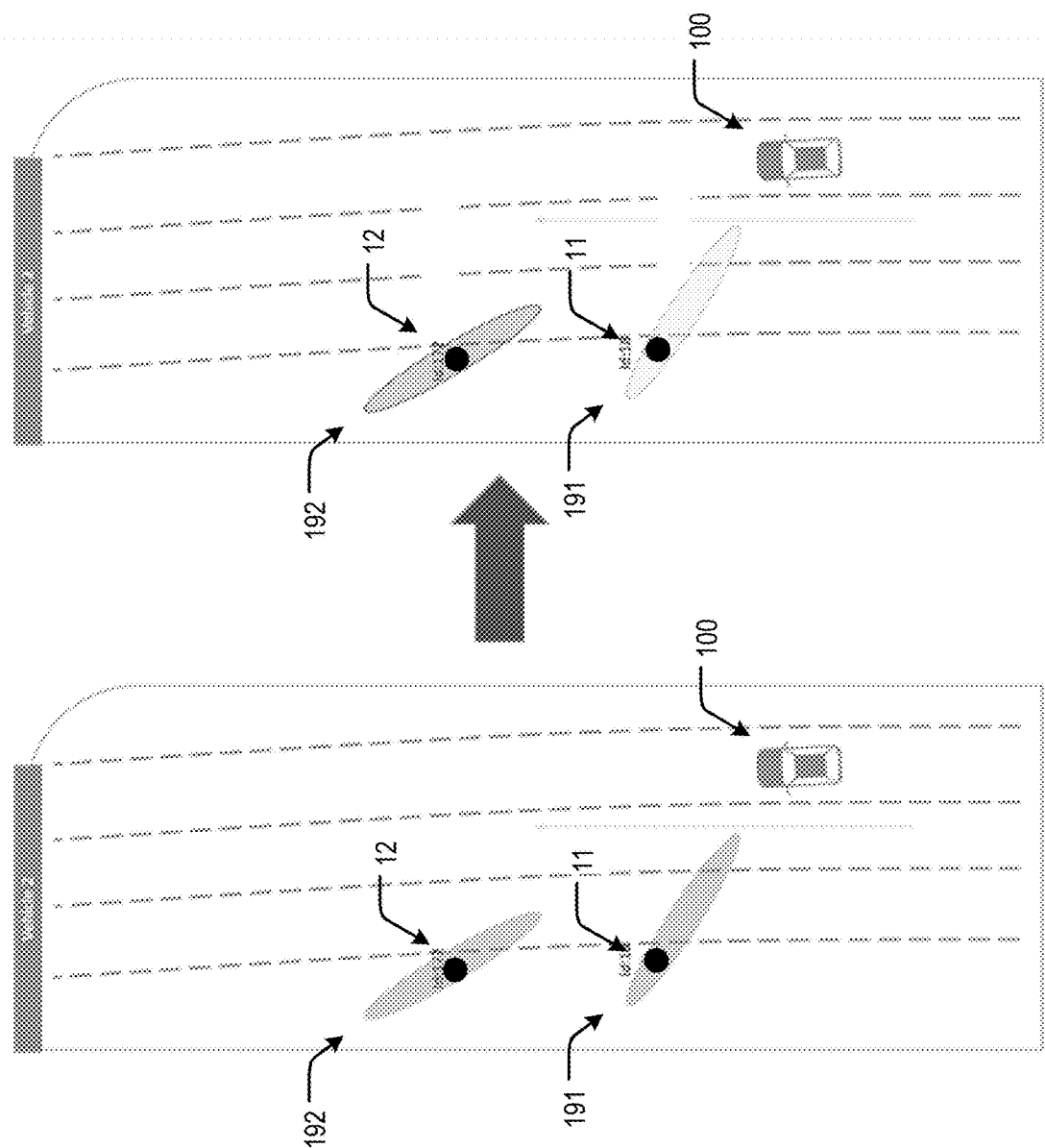
FIG. 4A is an illustration of covariance ellipses when there is no overlap between perceived positions of traffic lights, according to an exemplary embodiment of the present disclosure.

Referring again to the figures, FIG. 4A is an illustration of covariance ellipses when there is no overlap between perceived positions of traffic lights, according to an exemplary embodiment of the present disclosure. In one example, no conflict exists between ellipses associations. As shown, the AV 100 (via the above-described sensors and processing circuitry included therein) can detect or identify a first covariance ellipse 191 associated with a first traffic light 11 and a second covariance ellipse 192 associated with a second traffic light 12. FIG. 4A illustrates how, at the current position of the AV 100, both of the first traffic light 11 and the second traffic light 12 are not disposed along a similar line of sight relative to the AV 100, and thus the first covariance ellipse 191 and the second covariance ellipse 192 are distinguished by the AV 100 during an association process.

FIG. 4B is an illustration of covariance ellipses when there is overlap between perceived positions of traffic lights, according to an exemplary embodiment of the present disclosure. In one example, conflict or confusion can emerge during the association process of associating the first covariance ellipse 191 with the first traffic light 11 and the second covariance ellipse 192 with the second traffic light 12. As shown, this can be due to the first traffic light 11 (and thus the first covariance ellipse 191) and the second traffic light 12 (and thus the second covariance ellipse 192) being disposed along a similar light of sight relative to the AV 100. As such, the AV 100 may incorrectly determine there exists only one covariance ellipse (denoted as a merged covariance ellipse 191m), and by association, only one traffic light.

By considering the aforementioned examples, when the AV 100 is only using its local perception in FIG. 4B, the AV 100 would either associate both of the first covariance ellipse 191 and the second covariance ellipse 192 to the first traffic light 11, or reject one, such as the second covariance ellipse 192, and associate the first covariance ellipse 191 to the first traffic light 11. The reason is that the first covariance ellipse 191 is closer to the second traffic light 12 than to the first traffic light 11. Furthermore, the first covariance ellipse 101 is also closer to the second traffic light 12 than the second covariance ellipse 192.

In order to solve association issues generated by the AV 100 local perception, V2V communication is used.

In an embodiment, the traffic lights in the HD map are assumed to be precisely localized in the HD map. Once the AV 100 has identified the next traffic lights on the route of the AV 100, the AV 100 will send to the server the respective HD map traffic light IDs, and in addition, the result of its local perception (traffic lights ellipses parameters (e.g., center in global coordinates, demi-axes, and angle)). By sending these unique traffic lights IDs, the AV 100 will automatically generate a request to the server that will send all the current available information in a zone of the HD map around the target traffic lights. From the server perspective, the processing circuitry on the AV 100 will collect all covariance ellipses from all the cars in a district or a city. Once the server receives the request from the AV 100, the server will send all the coordinates of the covariance ellipses of all road users proximal to or within a predetermined radius of the target traffic light ID. The predetermined radius can be defined by a distance around the target traffic light, such as 100 meters.

Described herein is a mathematical representation of the overlap of the ellipses, such as the first covariance ellipse 191 and the second covariance ellipse 192. FIG. 5A is a flow diagram of a sub process of a method for confirming a perceived position of a traffic light from the perspective of the AV 100, according to an exemplary embodiment of the present disclosure. In step 505, for each set of covariance ellipses provided by one vehicle, an association process is performed to match potential candidates from another set of ellipses provided by another vehicle with respect to several criteria defined by a user. Those criteria can include, for instance, the Euclidian distance or the overlap between ellipses. That is, the user can define or select the criteria used during the association process, such as a Euclidian distance-based association process or an ellipses overlap-based association process. The selected criteria can be correlated to the quality of the traffic lights detection. In an embodiment, the criteria can be selected by the AV 100.

In an event where the association is unclear, conflicts are resolved by assigning the best candidate with respect to the computed criteria defined by the user.

To this end, FIG. 5B is an illustration of a sub process of resolving conflicts between perceived positions of traffic lights, according to an exemplary embodiment of the present disclosure. FIG. 5B shows the AV 100 and a second AV 102 along a same path and detecting the covariance ellipses of two traffic lights relative to their respective positions on said path.

In an example, the AV 100 can detect a first covariance ellipse 191a and a second covariance ellipse 192a, and the second AV 102 can detect a first covariance ellipse 191b and a second covariance ellipse 192b.

The possibilities of the second covariance ellipse 192a are described herein. In such an example, there is an overlap of 18% between the second covariance ellipse 192a (detected by the AV 100) and the second covariance ellipse 192b (detected by the second AV 102) with a Euclidean distance of 6.31 meters.

The possibilities of the first covariance ellipse 191a are described herein. In such an example, there is an overlap of 17% between the first covariance ellipse 191a (detected by the AV 100) and the second covariance ellipse 192b (detected by the second AV 102) with a Euclidean distance of 7.32 meters. In such an example, there is also an overlap of 15% between the first covariance ellipse 191a (detected by the AV 100) and the first covariance ellipse 191b (detected by the second AV 102) with a Euclidean distance of 5.31 meters.

The possibilities of the second covariance ellipse 192b are described herein. In such an example, there is an overlap of 18% between the second covariance ellipse 192b and the second covariance ellipse 192a with a Euclidean distance of 6.31 meters. In such an example, there is also an overlap of 17% between the second covariance ellipse 192b and the first covariance ellipse 191a with a Euclidean distance of 7.32 meters.

The possibilities of the first covariance ellipse 191b are described herein. In such an example, there is an overlap of 15% between the first covariance ellipse 191b and the first covariance ellipse 191a with a Euclidean distance of 5.31 meters.

A conflict search process is described herein. The second covariance ellipse 192b has two potential associations. A first association includes the overlap of 18% between the second covariance ellipse 192b and the second covariance ellipse 192a, as well as the overlap of 17% between the second covariance ellipse 192b and the first covariance ellipse 191a. There is not a single way to resolve conflicts; in the depicted example, conflicts are solved by considering the highest score with respect to the association criteria. In that case, the overlap of the second covariance ellipse 192b and the second covariance ellipse 192a has a higher overlap and a shorter distance than that of the second covariance ellipse 192b and the first covariance ellipse 191a. As such, for the above-described example, the result is that the second covariance ellipse 192a is associated with the second covariance ellipse 192b, and the first covariance ellipse 191a is associated with the first covariance ellipse 191b.

Figure 6:
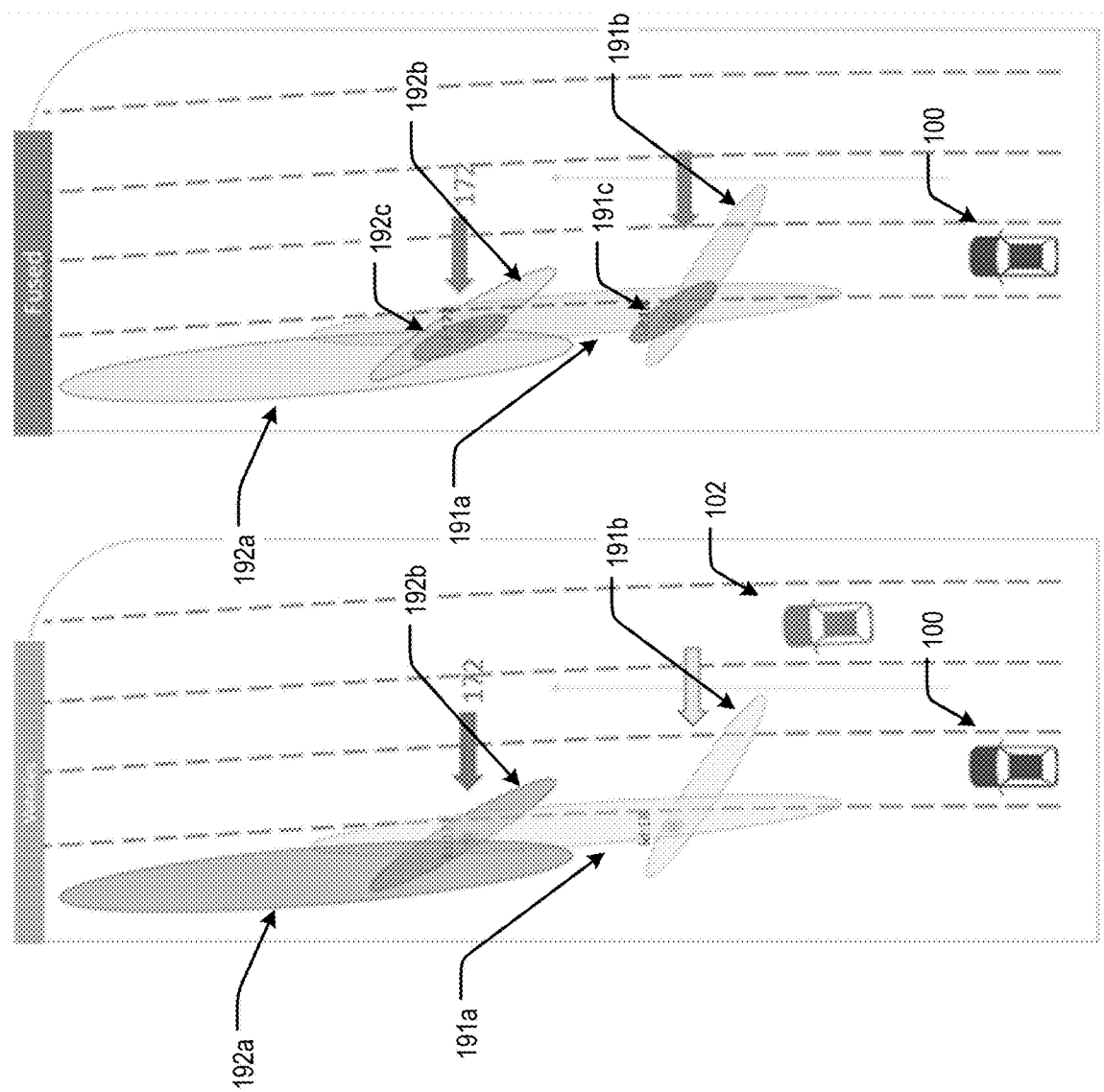
FIG. 6 is an illustration of fusion during a method for confirming a perceived position of a traffic light, according to an exemplary embodiment of the present disclosure.

FIG. 6 is an illustration of fusion during a method for confirming a perceived position of a traffic light, according to an exemplary embodiment of the present disclosure. In an embodiment, when all the ellipses are processed and the conflicts resolved, the process stops. The result of ellipse association from the AV 100 and the second AV 102 are then processed via a fusion process by the AV 100. In one example, a Bayesian fusion is used. An example is provided as:

$$\frac{1}{R_{fused}} = \frac{1}{R_{vehicle1}} + \frac{1}{R_{vehicle2}}$$

The process can recursively be repeated for the next vehicles by the AV 100, if any are present in a queue.

The AV 100 receives all the information of the equipped road vehicles (e.g., the second AV 102, a third AV, a fourth AV, etc.) around and computes the ellipses overlap between all the available ellipses, including the ones from its (the AV 100's) local perception, and fuses the ellipses together. This is shown as a first fused covariance ellipse 191c and a second fused covariance ellipse 192c, wherein the first fused covariance ellipse 191c represents the fusion associated with the first covariance ellipse 191a and the first covariance ellipse 191b, and the second fused covariance ellipse 192c represents the fusion associated with the second covariance ellipse 192a and the second covariance ellipse 192b.

Figure 7C:
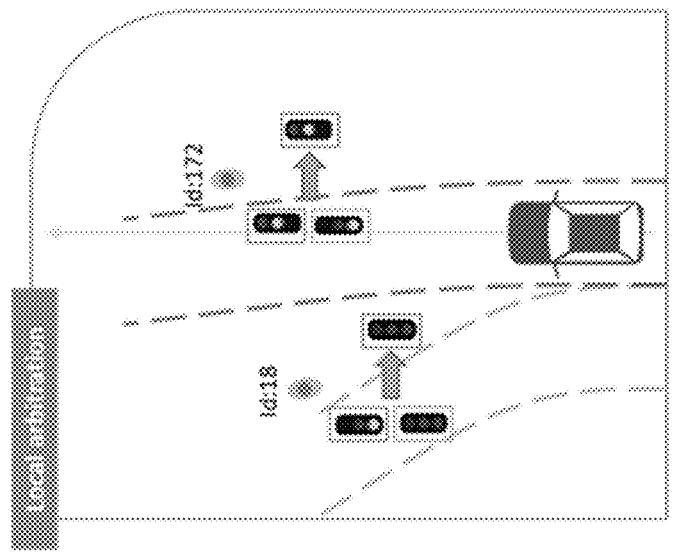
FIG. 7C is an illustration of arbitration regarding traffic light color estimation, according to an exemplary embodiment of the present disclosure.
Figure 7B:
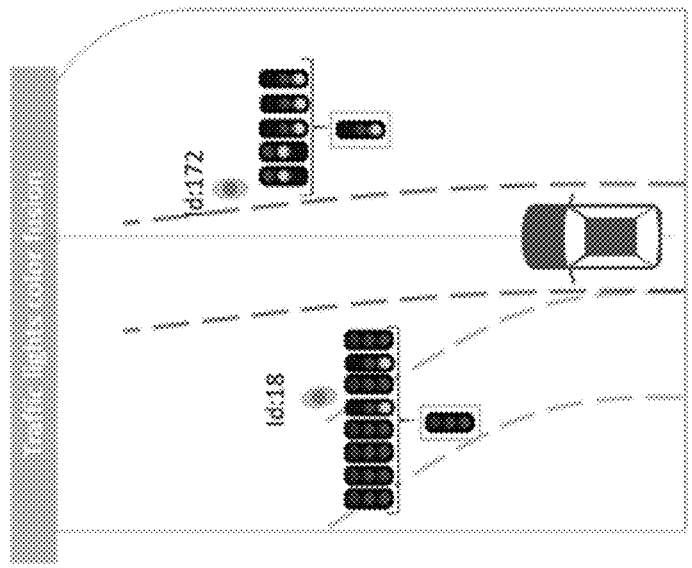
FIG. 7B is an illustration of traffic light color estimation fusion, according to an exemplary embodiment of the present disclosure.
Figure 7A:
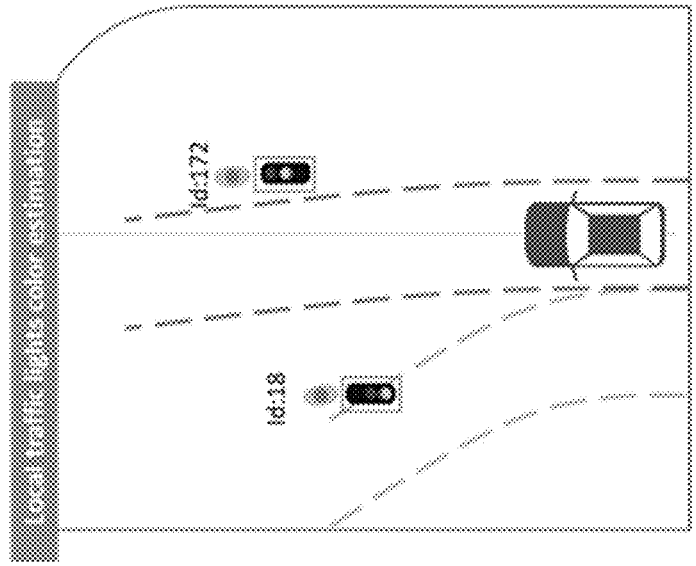
FIG. 7A is an illustration of a traffic light color estimation performed by a local vehicle, according to an exemplary embodiment of the present disclosure.

After association, another problem to solve is determining a color of the light of the traffic light. A solution is described herein:

FIG. 7A is an illustration of a traffic light color estimation performed by the AV 100, according to an exemplary embodiment of the present disclosure. FIG. 7B is an illustration of traffic light color estimation fusion, according to an exemplary embodiment of the present disclosure. FIG. 7C is an illustration of arbitration regarding traffic light color estimation, according to an exemplary embodiment of the present disclosure.

First, the AV 100 can detect the traffic lights and associate them to the HD map traffic lights. When the color on the traffic light(s) changes, the colors and HD Map traffic light's unique IDs are sent to the server (e.g., the cloud) for global fusion, which will consider all vehicles around this target area, such as a target intersection. As shown in FIGS. 7A-7C, the traffic lights boxes are the result of the local fusion (performed by the AV 100) HD map traffic light association combined with color estimation and color estimation confidence level) and the demarcated points in FIGS. 7A-7C are the HD map traffic lights each with its unique ID.

In FIG. 7B, the server can receive the traffic lights color from the AV 100 and all vehicles and perform a fusion of the colors using the collected, grouped information. The fusion process should be efficient in order to be reactive and inform the vehicles of the current result(s). A simple uniform probability association, for instance, is sufficient.

EXAMPLE

In an example, the server can determine probabilities for traffic light color(s) and select the color having the highest probability as the determined color of the traffic light. The result can be sent to the AV 100 to perform the described local arbitration.

Traffic Light 1 (TFL1) and Traffic Light 2 (TFL2)—

TFL1 probabilities: RED 0.13 ORANGE 0.08 GREEN 0.79

TFL2 probabilities: RED 0.30 ORANGE 0.09 GREEN 0.61

Computation: RED(0.13+0.3)/2, (0.08+0.09)/2, (0.79+0.61)/2

Result=MAX(0.215,0.085,0.7)=0.7=GREEN

In FIG. 7C, the server can send back the result to the vehicles and the AV 100 performs an arbitration. This arbitration can be the max probability of the considered traffic lights.

TFL via the server: RED 0.2 ORANGE 0.01 GREEN 0.79

TFL via the AV 100: RED 0.01 ORANGE 0.91 GREEN 0.08

Result: ORANGE with 0.91 score

Notably, feedback from arbitration is feeding both processes (associating traffic lights and ellipses, and fusing overlapping ellipses). Depending on the feedback, the processes can "rethink" their strategy without mixing local and global Traffic Lights.

Figure 8:
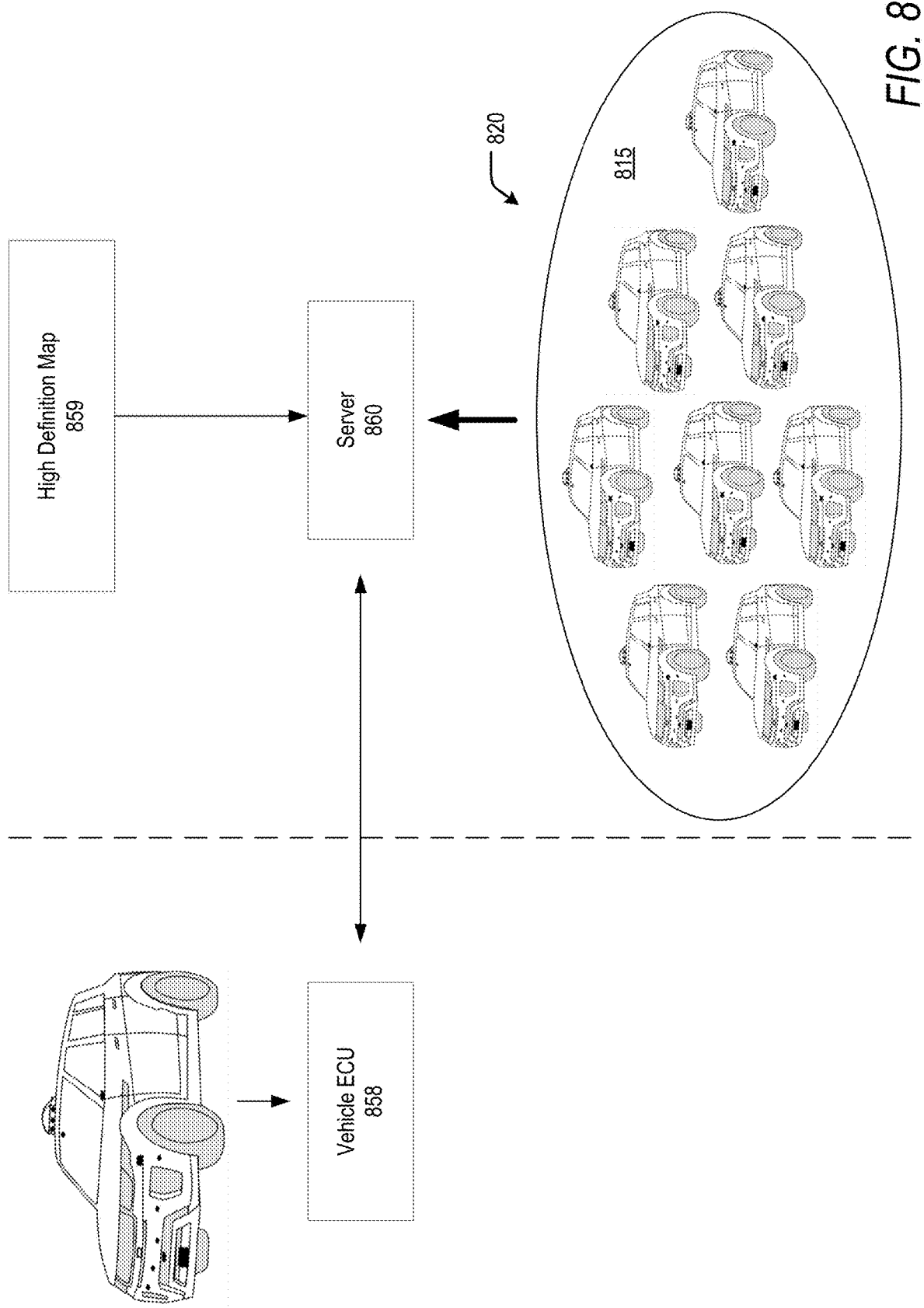
FIG. 8 is a schematic of fleet distribution of a local navigational map update, according to an exemplary embodiment of the present disclosure.

Referring now to FIG. 8, FIG. 8 is a schematic of fleet distribution of a local NAV map update. According to an exemplary embodiment of the present disclosure, having updated a local NAV map for a single AV via vehicle ECU 858, the update can be sent to a cloud-computing environment wherein the updated local NAV map can be integrated with the global NAV map via server 860. In an embodiment, the updated local NAV map is a layer with discerning features relevant to only a region of the global NAV map. In an embodiment, the updated local NAV map is a complete version, or a complete version of a layer, of the NAV map that is integrated with the global NAV map of the cloud-computing environment.

In an embodiment, a plurality of updated local NAV maps 859 can be concurrently sent to the cloud-computing environment for integration into the global NAV map. The integrated global NAV map will be the combination of all the local updates from all of the time-locked data from each AV.

In the end, having integrated the one or more updated local NAV maps into the global NAV map of the cloud-computing environment, the updated global NAV map can be distributed to the fleet of AVs 820. In distributing the updated global NAV map to each AV of the fleet of AVs 820, each AV of the fleet of AVs 820 is then able to learn how to manage an impediment as was done by a remote operator of the initial AV. Moreover, by learning how to manage the impediment or, for example, plurality of impediments at varying map zones, the fleet of AVs 820 can obviate the need to request remote operation when encountering those, or similar, impediments.

In an embodiment, sharing the updated global NAV map with each AV of the fleet of AVs 820 can be done in real-time or offline via wireless communication from the cloud-computing environment.

In an embodiment, and in the case where multiple AVs are traveling along a similar path, V2V communication can allow for more immediate communication of impediment circumnavigation.

For example, a situation may occur wherein a first AV, having utilized a remote operator in navigating an impediment, delays, according to a configuration of the first AV, updating a global NAV map until the first AV returns to a parking spot, garage, or other 'home' location. In this case, the local NAV map update, and navigation therein, is not available to subsequent AVs that may travel the same route prior to the first AV updating the global NAV map (which, in turn, may be disseminated to the fleet of 'subsequent' AVs). V2V communication can be deployed in order to transmit the local NAV map update from the first AV to proximate AVs that may travel the same route. Therefore, though not updated within the global NAV map, the relevant remote operation path and annotations can be distributed to proximate AVs.

Further to the above example, the updated local NAV map can be distributed to, for instance, vehicles within a pre-determined radius of the first AV, the pre-determined radius being determined as a region of travel wherein a subsequent AV is likely to traverse the same route as the first AV. The pre-determined radius may be, assuming sufficient density of surrounding AVs to permit V2V communication, for instance, 10 miles.

In the end, upon returning to the parking spot, the garage, or other 'home' location, the first AV can transmit its local NAV map update to the global NAV map.

With reference again to FIG. 8 and the vehicle ECU 858, a plurality of local NAV map updates, from a plurality of AVs, can be evaluated, either in a cloud-computing environment or on an AV, and merged into an updated global NAV map. To this end, the global NAV map update can be handled in different ways.

First, if a local NAV map update is directed to a unique region or area of the global NAV map, the local NAV map update can be simply merged with the global NAV map.

Second, if a local NAV map update is directed to a region or area also updated by a second local NAV map update, the most recently recorded local NAV map update will be merged with the global NAV map.

Third, in a scenario where multiple local NAV map updates are recorded within a short time frame (e.g., concurrently or within minutes), the local NAV map update can be selected based upon the confidence level of each sensor and based upon the annotations of the remote operator. Accordingly, the most appropriate local NAV map update will be selected by, for example, the cloud-computing environment, for merging with the global NAV map.

The confidence level of each sensor can be managed at two levels: (1) the level of the sensor and (2) the level of the remote operator. In an embodiment, (1) each sensor and sensor fusion on the AV can provide a confidence level for the detection of an object and the classification of an object. Accordingly, the vehicle control system can use this information to compare concurrent local NAV map updates to determine which is more confident. Moreover, in an embodiment, (2) the remote operator can provide annotations as to the confidence level of the plurality of vehicle sensors based upon remote operator visualization in the context of the performance of the plurality of vehicle sensors. For example, though a vehicle sensor may exhibit a high-level of confidence, a remote operator may determine that the vehicle control system has not accurately detected and/or classified an object of the scene, and can, therefore, lower the confidence level of that vehicle sensor.

In an embodiment, and with regard to the third scenario described above, a situation may occur in which a first AV, having delayed transmittal of an updated local NAV map, is followed by, for instance, a second AV and a third AV traveling along the same route which must also request assistance from a remote controller. A distinct remotely controlled path and annotation may then exist for each of the first AV, the second AV, and the third AV describing the same navigation. In one embodiment, evaluation and selection of the updated local NAV maps of the first AV, the second AV, and the third AV and merging with the global NAV map may proceed, as described above, in the cloud-computing environment.

In an embodiment, selection of the updated local NAV maps of the first AV, the second AV, and the third AV may be performed locally by the vehicle control system of one AV of the three AVs prior to being transmitted for merging with a global NAV map. For example, the first AV may receive, upon returning to its parking spot, garage, or 'home' location, the updated local NAV map from each of the second AV and the third AV. Based upon the relative time of travel, the confidence level of each sensor, and the annotations of the remote operator, and the like, one of the three AVs may be selected, by the vehicle control system of the first AV, to be transmitted and merged with the global NAV map. The updated global NAV map can then be distributed to each AV of the fleet of AVs.

Having integrated the one or more local NAV map updates into the global NAV map, and having shared the updated global NAV map with the fleet of AVs, each AV of the fleet of AVs can learn how to handle the same, or similar, impediment, allowing the AV to proceed around the impediment under autonomous control.

In such instances, the vehicle can also use its own sensing technology to understand the current environment, much in the same way as the original impediment was detected. Based upon any changes, detected by the plurality of vehicle sensors, in the current environment, the vehicle will react differently.

Initially, and as expected, if the vehicle control system, with the plurality of vehicle sensors, detects a similar environment or object to the environment or object circumnavigated previously by a remote operator, the AV will use the trajectory provided by the remotely operated AV for navigation and, therefore, will not need the support of the remote operator.

However, as suggested, there may be changes in the environment. For example, if the vehicle control system, with the plurality of vehicle sensors, does not detect the 'impediment' previously circumnavigated and as expected from the local NAV map, the local NAV map can again be updated according to the process described above, or can be reverted to a previous version of the local NAV map, if appropriate. Moreover, similarly to the above, the updated local NAV map can be sent to the cloud-computing environment, integrated with the global NAV map, and distributed to the fleet of AVs for improved preparedness in navigation.

FIG. 9 illustrates an exemplary Internet-based navigation system, wherein AVs are connected to a remote operator and to a cloud-computing environment via waypoints that are connected to the Internet.

According to an embodiment, an AV 900 having a vehicle control system 901 can connect to the Internet 980, via a wireless communication hub, through a wireless communication channel such as a base station 983 (e.g., an Edge, 3G, 4G, 5G, or LTE Network), an access point 982 (e.g., a femto cell or Wi-Fi network), or a satellite connection 981. Merely representative, each AV of a fleet of AVs 920 may similarly connect to the Internet 980 in order to upload and download updated NAV maps. In an example, a global NAV map can be stored in a data storage center 993 of a cloud-computing environment 990. A cloud-computing controller 991 in concert with a cloud-computing processing center 992 can permit uploading, storing, processing, and downloading of NAV maps from the data storage center 993. Updated local NAV maps can be transmitted to the cloud-computing environment 990 via the Internet 980 for integration within a global NAV map stored within the data storage center 993. The cloud-computing processing center 992 can be a computer duster, a data center, a main frame computer, or a server farm. In one implementation, the cloud-computing processing center 992 and data storage center 993 are collocated.

In an embodiment, raw and/or processed information from a plurality of vehicle sensors can be transmitted to the cloud-computing environment 990 for processing by the cloud-computing processing center 992 and/or storage in the data storage center 993. In the case of raw information, the cloud-computing processing center 992 can perform processing similar to that performed by the vehicle control system 901 of the AV 900 during AV operation. These processes include, among other processes, object identification and image classification.

According to an embodiment, a remote operator may perform annotation on a local NAV map at the level of the AV 900 or may perform annotation on a local NAV map at the level of the cloud-computing environment 990. To this end, a remote operator 956 can access the cloud-computing environment 990 through a remote control center 985 such as a desktop or laptop computer or workstation that is connected to the Internet 980 via a wired network connection or a wireless network connection.

Figure 10:
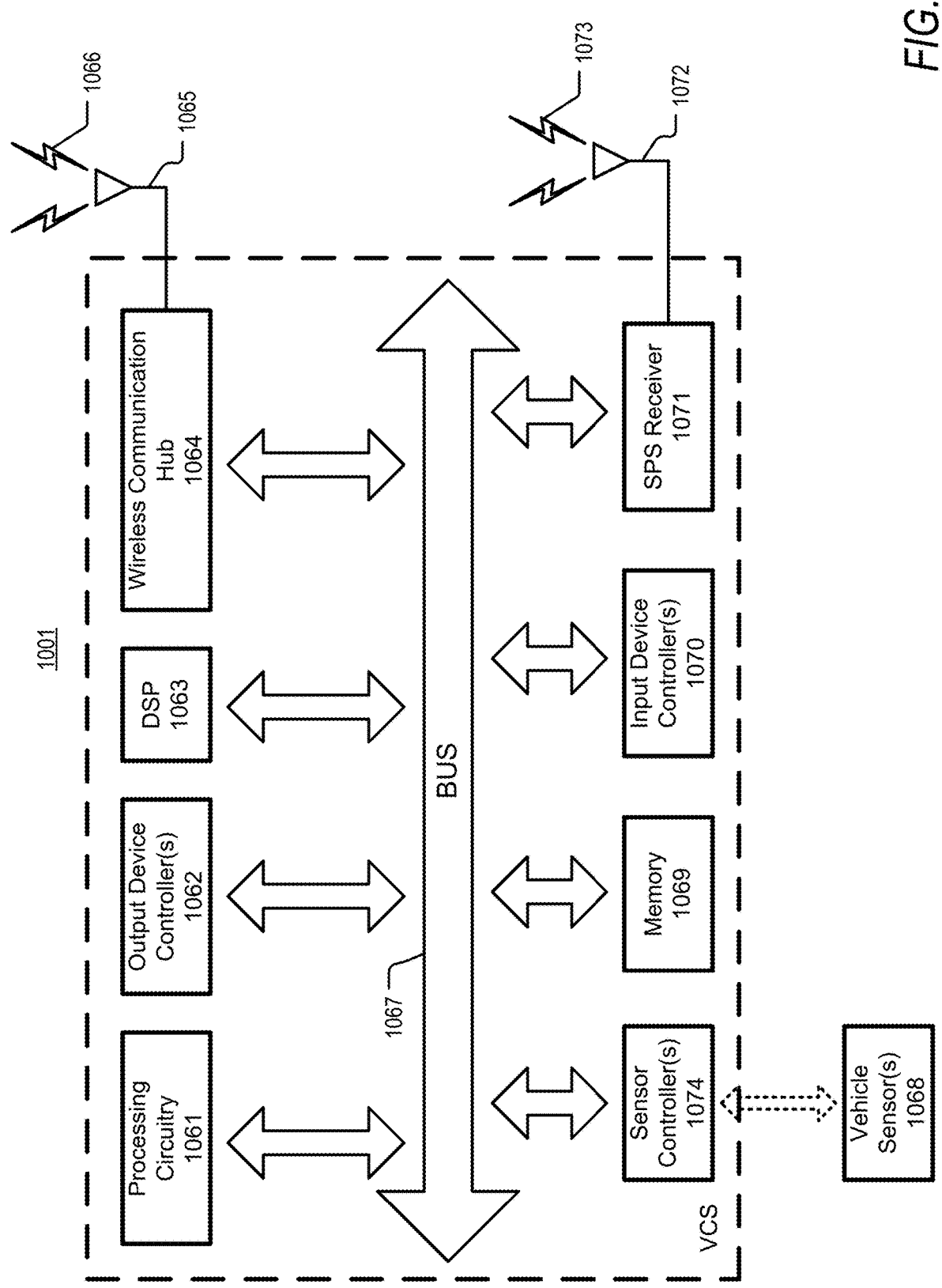
FIG. 10 is a block diagram of a vehicle control system, according to an exemplary embodiment of the present disclosure.

FIG. 10 is a block diagram of internal components of an example of a vehicle control system (VCS) that may be implemented, according to an embodiment. As discussed above, the VCS may be an electronics control unit (ECU). For instance, VCS 1001 may represent an implementation of a telematics and GPS ECU or a video ECU. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations.

The VCS 1001 is shown comprising hardware elements that can be electrically coupled via a BUS 1067 (or may otherwise be in communication, as appropriate). The hardware elements may include processing circuitry 1061 which can include without limitation one or more processors, one or more special-purpose processors (such as digital signal processing (DSP) chips, graphics acceleration processors, application specific integrated circuits (ASICs), and/or the like), and/or other processing structure or means. The above-described processors can be specially programmed to perform operations including, among others, image processing and data processing. Some embodiments may have a separate DSP 1063, depending on desired functionality. The VCS 1001 also can include one or more input device controllers 1070, which can control without limitation an in-vehicle touch screen, a touch pad, microphone, button(s), dial(s), switch(es), and/or the like. The VCS 1001 can also include one or more output device controllers 1062, which can control without limitation a display, light emitting diode (LED), speakers, and/or the like.

The VCS 1001 might also include a wireless communication hub 1064, which can include without limitation a modem, a network card, an infrared communication device, a wireless communication device, and/or a chipset (such as a Bluetooth device, an IEEE 802.11 device, an IEEE 802.16.4 device, a Wi-Fi device, a WiMAX device, cellular communication facilities including 4G, 5G, etc.), and/or the like. The wireless communication hub 1064 may permit data to be exchanged with, as described, in part, with reference to FIG. 9, a network, wireless access points, other computer systems, and/or any other electronic devices described herein. The communication can be carried out via one or more wireless communication antenna(s) 1065 that send and/or receive wireless signals 1066.

Depending on desired functionality, the wireless communication hub 1064 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a WiMAX (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on, including 4G and 5G technologies.

The VCS 1001 can further include sensor controller(s) 1074. Such controllers can control, without limitation, the plurality of vehicle sensors 1068, including, among others, one or more accelerometer(s), gyroscope(s), camera(s), RADAR(s), LiDAR(s), Ultrasonic sensor(s), magnetometer(s), altimeter(s), microphone(s), proximity sensor(s), light sensor(s), and the like.

Embodiments of the VCS 1001 may also include a Satellite Positioning System (SPS) receiver 1071 capable of receiving signals 1073 from one or more SPS satellites using an SPS antenna 1072. The SPS receiver 1071 can extract a position of the device, using conventional techniques, from satellites of an SPS system, such as a global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 1071 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The VCS 1001 may further include and/or be in communication with a memory 1069. The memory 1069 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 1069 of the VCS 1001 also can comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a computer (or other device) to perform one or more operations in accordance with the described methods, thereby resulting in a special-purpose computer.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally, or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Obviously, numerous modifications and variations are possible in light of the above teachings. For example, the processes of the present disclosure may be performed entirely on the vehicle, entirely on the server, or divided such that some are performed on the vehicle while others are performed on the server. Also, a vehicle may serve as a server. It is therefore to be understood that within the scope of the appended claims, embodiments of the present disclosure may be practiced otherwise than as specifically described herein.

Embodiments of the present disclosure may also be as set forth in the following parentheticals.

(1) A method for confirming a perceived position of a traffic light, comprising obtaining, by processing circuitry, traffic light identifiers and results of a first perception of traffic lights associated with the traffic light identifiers, the results of the first perception including a first estimation of an ellipse encompassing each of the traffic lights, the first perception being performed by a first vehicle, receiving, by the processing circuitry, results of a second perception of traffic lights associated with the traffic light identifiers, the results of the second perception including a second estimation of an ellipse encompassing each of the traffic lights, the second perception being performed by a second vehicle, calculating, by the processing circuitry and based on the obtained results of the first perception and the received results of the second perception, association parameters for each possible pair of estimated ellipses encompassing each of the traffic lights perceived by the first vehicle and perceived by the second vehicle, each possible pair of the estimated ellipses including one ellipse estimated by the first vehicle and one ellipse estimated by the second vehicle, selecting, by the processing circuitry and based on the calculated association parameters for each possible pair of estimated ellipses, matching pairs of estimated ellipses, and fusing, by the processing circuitry, each matching pair of estimated ellipses, each fused matching pair corresponding to one of the traffic light identifiers.

(2) The method according to (1), further comprising receiving, by the processing circuitry, the results of the second perception performed by the second vehicle when it is determined there is overlap between the results of the first perception of the traffic lights.

(3) The method according to either (1) or (2), further comprising obtaining, by the processing circuitry, a first color status estimation for each of the traffic lights associated with each fused matching pair, the first color status estimation being performed by the first vehicle, and receiving, by the processing circuitry, a second color status estimation for each of the traffic lights associated with each fused matching pair.

(4) The method according to any one of (1) to (3), further comprising performing, by the processing circuitry and based on color status estimations for each of the traffic lights associated with each fused matching pair, an arbitration to determine a likely color status for each of the traffic lights.

(5) The method according to any one of (1) to (4), wherein the performed arbitration determines a color status having a maximum probability based on a uniform probability association between color statuses and the color status estimations for each of the traffic lights.

(6) The method according to any one of (1) to (5), wherein each ellipse is a covariance ellipse and each estimation includes an estimation of a center of the covariance ellipse in global coordinates, demi-axes, and angle.

(7) The method according to any one of (1) to (6), wherein the association parameters for each possible pair of estimated ellipses include at least one of a Euclidean distance and a percentage of overlap between estimated ellipses of each possible pair of estimated ellipses.

(8) The method according to any one of (1) to (7), wherein the selected matching pairs of estimated ellipses are selected based on a comparison of the association parameters for each possible pair of estimated ellipses and association criteria, the association criteria including thresholds that values of the association parameters are compared to.

(9) The method according to any one of (1) to (8), further comprising performing, by the processing circuitry, the fusion of each matching pair of estimated ellipses by Bayesian fusion.

(10) An apparatus for confirming a perceived position of a traffic light, comprising processing circuitry configured to obtain traffic light identifiers and results of a first perception of traffic lights associated with the traffic light identifiers, the results of the first perception including a first estimation of an ellipse encompassing each of the traffic lights, the first perception being performed by a first vehicle, receive results of a second perception of traffic lights associated with the traffic light identifiers, the results of the second perception including a second estimation of an ellipse encompassing each of the traffic lights, the second perception being performed by a second vehicle, calculate, based on the obtained results of the first perception and the received results of the second perception, association parameters for each possible pair of estimated ellipses encompassing each of the traffic lights perceived by the first vehicle and perceived by the second vehicle, each possible pair of the estimated ellipses including one ellipse estimated by the first vehicle and one ellipse estimated by the second vehicle, select, based on the calculated association parameters for each possible pair of estimated ellipses, matching pairs of estimated ellipses, and fuse each matching pair of estimated ellipses, each fused matching pair corresponding to one of the traffic light identifiers.

(11) The apparatus according to (10), wherein the processing circuitry is further configured to receive the results of the second perception performed by the second vehicle when it is determined there is overlap between the results of the first perception of the traffic lights.

(12) The apparatus according to either (10) or (11), wherein the processing circuitry is further configured to obtain a first color status estimation for each of the traffic lights associated with each fused matching pair, the first color status estimation being performed by the first vehicle, and receive a second color status estimation for each of the traffic lights associated with each fused matching pair.

(13) The apparatus according to any one of (10) to (12), wherein the processing circuitry is further configured to perform, based on color status estimations for each of the traffic lights associated with each fused matching pair, an arbitration to determine a likely color status for each of the traffic lights.

(14) The apparatus according to any one of (10) to (13), wherein the performed arbitration determines a color status having a maximum probability based on a uniform probability association between color statuses and the color status estimations for each of the traffic lights.

(15) The apparatus according to any one of (10) to (14), wherein each ellipse is a covariance ellipse and each estimation includes an estimation of a center of the covariance ellipse in global coordinates, demi-axes, and angle.

(16) The apparatus according to any one of (10) to (15), wherein the association parameters for each possible pair of estimated ellipses include at least one of a Euclidean distance and a percentage of overlap between estimated ellipses of each possible pair of estimated ellipses.

(17) The apparatus according to any one of (10) to (16), wherein the selected matching pairs of estimated ellipses are selected based on a comparison of the association parameters for each possible pair of estimated ellipses and association criteria, the association criteria including thresholds that values of the association parameters are compared to.

(18) The apparatus according to any one of (10) to (17), wherein the processing circuitry is further configured to perform the fusion of each matching pair of estimated ellipses by Bayesian fusion.

(19) A non-transitory computer-readable storage medium storing computer-readable instructions that, when executed by a computer, cause the computer to perform a method for confirming a perceived position of a traffic light, comprising obtaining traffic light identifiers and results of a first perception of traffic lights associated with the traffic light identifiers, the results of the first perception including a first estimation of an ellipse encompassing each of the traffic lights, the first perception being performed by a first vehicle, receiving results of a second perception of traffic lights associated with the traffic light identifiers, the results of the second perception including a second estimation of an ellipse encompassing each of the traffic lights, the second perception being performed by a second vehicle, calculating, based on the obtained results of the first perception and the received results of the second perception, association parameters for each possible pair of estimated ellipses encompassing each of the traffic lights perceived by the first vehicle and perceived by the second vehicle, each possible pair of the estimated ellipses including one ellipse estimated by the first vehicle and one ellipse estimated by the second vehicle, selecting, based on the calculated association parameters for each possible pair of estimated ellipses, matching pairs of estimated ellipses, and fusing each matching pair of estimated ellipses, each fused matching pair corresponding to one of the traffic light identifiers.

(20) The non-transitory computer-readable storage medium according to (19), further comprising receiving the results of the second perception performed by the second vehicle when it is determined there is overlap between the results of the first perception of the traffic lights.

Thus, the foregoing discussion discloses and describes merely exemplary embodiments of the present disclosure. As will be understood by those skilled in the art, the present disclosure may be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A method for confirming a perceived position of a traffic light, comprising:
   obtaining, by processing circuitry, traffic light identifiers and results of a first perception of traffic lights associated with the traffic light identifiers, the results of the first perception including a first estimation of an ellipse encompassing each of the traffic lights, the first perception being performed by a first vehicle;
   receiving, by the processing circuitry, results of a second perception of traffic lights associated with the traffic light identifiers, the results of the second perception including a second estimation of an ellipse encompassing each of the traffic lights, the second perception being performed by a second vehicle;
   calculating, by the processing circuitry and based on the obtained results of the first perception and the received results of the second perception, association parameters for each possible pair of estimated ellipses encompassing each of the traffic lights perceived by the first vehicle and perceived by the second vehicle, each possible pair of the estimated ellipses including one ellipse estimated by the first vehicle and one ellipse estimated by the second vehicle;
   selecting, by the processing circuitry and based on the calculated association parameters for each possible pair of estimated ellipses, matching pairs of estimated ellipses; and
   fusing, by the processing circuitry, each matching pair of estimated ellipses, each fused matching pair corresponding to one of the traffic light identifiers.

2. The method according to claim 1, further comprising receiving, by the processing circuitry, the results of the second perception performed by the second vehicle when it is determined there is overlap between the results of the first perception of the traffic lights.

3. The method according to claim 2, further comprising obtaining, by the processing circuitry, a first color status estimation for each of the traffic lights associated with each fused matching pair, the first color status estimation being performed by the first vehicle, and
   receiving, by the processing circuitry, a second color status estimation for each of the traffic lights associated with each fused matching pair.

4. The method according to claim 3, further comprising performing, by the processing circuitry and based on color status estimations for each of the traffic lights associated with each fused matching pair, an arbitration to determine a likely color status for each of the traffic lights.

5. The method according to claim 4, wherein the performed arbitration determines a color status having a maximum probability based on a uniform probability association between color statuses and the color status estimations for each of the traffic lights.

6. The method according to claim 1, wherein each ellipse is a covariance ellipse and each estimation includes an estimation of a center of the covariance ellipse in global coordinates, demi-axes, and angle.

7. The method according to claim 1, wherein the association parameters for each possible pair of estimated ellipses include at least one of a Euclidean distance and a percentage of overlap between estimated ellipses of each possible pair of estimated ellipses.

8. The method according to claim 1, wherein the selected matching pairs of estimated ellipses are selected based on a comparison of the association parameters for each possible pair of estimated ellipses and association criteria, the association criteria including thresholds that values of the association parameters are compared to.

9. The method according to claim 1, further comprising performing, by the processing circuitry, the fusion of each matching pair of estimated ellipses by Bayesian fusion.

10. An apparatus for confirming a perceived position of a traffic light, comprising:
    processing circuitry configured to
       obtain traffic light identifiers and results of a first perception of traffic lights associated with the traffic light identifiers, the results of the first perception including a first estimation of an ellipse encompassing each of the traffic lights, the first perception being performed by a first vehicle,
       receive results of a second perception of traffic lights associated with the traffic light identifiers, the results of the second perception including a second estimation of an ellipse encompassing each of the traffic lights, the second perception being performed by a second vehicle,
       calculate, based on the obtained results of the first perception and the received results of the second perception, association parameters for each possible pair of estimated ellipses encompassing each of the traffic lights perceived by the first vehicle and perceived by the second vehicle, each possible pair of the estimated ellipses including one ellipse estimated by the first vehicle and one ellipse estimated by the second vehicle,
       select, based on the calculated association parameters for each possible pair of estimated ellipses, matching pairs of estimated ellipses, and
       fuse each matching pair of estimated ellipses, each fused matching pair corresponding to one of the traffic light identifiers.

11. The apparatus according to claim 10, wherein the processing circuitry is further configured to
    receive the results of the second perception performed by the second vehicle when it is determined there is overlap between the results of the first perception of the traffic lights.

12. The apparatus according to claim 11, wherein the processing circuitry is further configured to
    obtain a first color status estimation for each of the traffic lights associated with each fused matching pair, the first color status estimation being performed by the first vehicle, and
    receive a second color status estimation for each of the traffic lights associated with each fused matching pair.

13. The apparatus according to claim 12, wherein the processing circuitry is further configured to perform, based on color status estimations for each of the traffic lights associated with each fused matching pair, an arbitration to determine a likely color status for each of the traffic lights.

14. The apparatus according to claim 13, wherein the performed arbitration determines a color status having a maximum probability based on a uniform probability association between color statuses and the color status estimations for each of the traffic lights.

15. The apparatus according to claim 10, wherein each ellipse is a covariance ellipse and each estimation includes an estimation of a center of the covariance ellipse in global coordinates, demi-axes, and angle.

16. The apparatus according to claim 10, wherein the association parameters for each possible pair of estimated ellipses include at least one of a Euclidean distance and a percentage of overlap between estimated ellipses of each possible pair of estimated ellipses.

17. The apparatus according to claim 10, wherein the selected matching pairs of estimated ellipses are selected based on a comparison of the association parameters for each possible pair of estimated ellipses and association criteria, the association criteria including thresholds that values of the association parameters are compared to.

18. The apparatus according to claim 10, wherein the processing circuitry is further configured to
perform the fusion of each matching pair of estimated ellipses by Bayesian fusion.

19. A non-transitory computer-readable storage medium storing computer-readable instructions that, when executed by a computer, cause the computer to perform a method for confirming a perceived position of a traffic light, the method comprising:

obtaining traffic light identifiers and results of a first perception of traffic lights associated with the traffic light identifiers, the results of the first perception including a first estimation of an ellipse encompassing each of the traffic lights, the first perception being performed by a first vehicle;

receiving results of a second perception of traffic lights associated with the traffic light identifiers, the results of the second perception including a second estimation of an ellipse encompassing each of the traffic lights, the second perception being performed by a second vehicle;

calculating, based on the obtained results of the first perception and the received results of the second perception, association parameters for each possible pair of estimated ellipses encompassing each of the traffic lights perceived by the first vehicle and perceived by the second vehicle, each possible pair of the estimated ellipses including one ellipse estimated by the first vehicle and one ellipse estimated by the second vehicle;

selecting, based on the calculated association parameters for each possible pair of estimated ellipses, matching pairs of estimated ellipses; and fusing each matching pair of estimated ellipses, each fused matching pair corresponding to one of the traffic light identifiers.

20. The non-transitory computer-readable storage medium according to claim 19, further comprising
receiving the results of the second perception performed by the second vehicle when it is determined there is overlap between the results of the first perception of the traffic lights.

* * * * *